United States Patent [19]

Chang et al.

[11] 3,962,369

[45] June 8, 1976

[54] SEALER-PRIMER FOR ELASTOMERIC COATINGS

[75] Inventors: Wen-Hsuan Chang, Gibsonia; Roger L. Scriven, Pittsburgh; Paul J. Prucnal, Monroeville, all of Pa.

[73] Assignee: PPG Industries, Inc., Pittsburgh, Pa.

[22] Filed: Dec. 19, 1974

[21] Appl. No.: 534,405

Related U.S. Application Data

[63] Continuation-in-part of Ser. No. 361,016, May 16, 1973, abandoned.

[52] U.S. Cl. ........................... 260/849; 260/2.5 AT; 260/42.29; 260/75 NK; 260/850; 260/856; 428/121; 428/256; 428/268
[51] Int. Cl.².................... C08L 61/20; C08L 61/26
[58] Field of Search..................... 260/849, 850, 856

[56] References Cited
UNITED STATES PATENTS

| | | | |
|---|---|---|---|
| 2,625,535 | 1/1953 | Mastin | 260/75 TN |
| 3,006,897 | 10/1961 | Parker | 260/75 |
| 3,019,212 | 1/1962 | Parker | 260/75 |
| 3,384,606 | 5/1968 | Dieterich et al. | 260/849 |
| 3,419,510 | 12/1968 | Hudak | 260/18 |
| 3,502,557 | 3/1970 | Yurcheshen et al. | 260/850 |
| 3,542,718 | 11/1970 | Davis et al. | 260/849 |
| 3,759,873 | 9/1973 | Hudak | 260/850 |

FOREIGN PATENTS OR APPLICATIONS

| | | | |
|---|---|---|---|
| 203,086 | 6/1955 | Australia | 260/850 |

*Primary Examiner*—Murray Tillman
*Assistant Examiner*—J. Ziegler
*Attorney, Agent, or Firm*—William J. Uhl

[57] ABSTRACT

Compositions useful as sealing primers for elastomeric coatings comprise (A) the reaction product of a polyurethane polyol and a polycarboxylic acid or acid anhydride, and (B) an aminoplast resin. When used as primers, the compositions of the instant invention increase the durability, gloss retention and adhesion of elastomeric coatings. Such primers are particularly useful on resilient and rubbery substrates such as EPDM rubber, foam rubber, polyurethane foam and vinyl foam.

10 Claims, No Drawings

SEALER-PRIMER FOR ELASTOMERIC COATINGS

CROSS REFERENCE TO RELATED APPLICATIONS

This application is a continuation-in-part of copending application Ser. No. 361,016, filed May 16, 1973, now abandoned.

BACKGROUND OF THE INVENTION

Recently, there has been interest in the use of rubbery, resilient materials for areas which are subject to mechanical shock, such as vehicle bumpers and moldings, exposed corners and surfaces of industrial machines, kickplates and other areas of doors and entrances, and the like. Such resilient materials aid in providing protection against permanent damage. However, in order to attain the desired appearance, a decorative and protective coating must be applied to the surface, and this coating is subject to damage during use. Conventional coatings, including those employed on rubber and similar extensible objects heretofore, do not have the required combination of properties to render them commercially feasible. The requisite properties include extensibility, tensile strength, package stability, film stability, impact resistance, adhesion, chemical and humidity resistance, resistance to cracking under temperature-humidity cycling, sprayability at reasonable solids contents, non-toxicity, and sensitivity to moisture.

It is especially difficult to obtain the above properties in combination since, in most instances, the obtention of one or more of the properties desired requires the use of materials and formulations which under ordinary circumstances tend to make the other desired properties less satisfactory.

Recent developments in this area have produced elastomeric coating compositions which meet the above criteria. These compositions broadly comprise (1) a hydroxyl-containing urethane reaction product of an organic polyisocyanate and a polyhydric material, or, more simply, a polyurethane polyol, and (2) an aminoplast resin. These compositions are storage stable in one package, and when cured, form coatings which are adherent, durable and highly extensible. The coatings are particularly useful on resilient and rubbery substrates, such as EPDM rubber, foam rubber, polyurethane foam and vinyl foam, and on metal surfaces such as mild steel, and aluminum.

While the above-desired coating compositions have many excellent properties, they also have certain disadvantages. In some instances, inadequate adhesion to the substrate has been a problem. When EPDM rubber substrates are used, oily materials seep up (i.e., spew) through the substrate and adversely affect the elastomeric coating, destroying the durability and gloss retention of such coatings.

SUMMARY OF THE INVENTION

It has now been found that the overall properties of coating compositions based on polyurethane polyols are greatly improved by utilizing a sealing-primer composition comprising (A) the reaction product of a polyurethane polyol and a polycarboxylic acid or acid anhydride, and (B) an aminoplast resin. Coatings, in which said priming compositions have been applied to the substrate, have exceptional adhesion to the substrate. Where EPDM rubber and foam type substrates are utilized and are primed with the compositions of the instant invention, the elastomeric coatings applied thereover exhibit greatly improved durability and gloss retention. Finally, the overall excellent properties of the elastomeric coatings are retained, and are in many instances enhanced.

The compositions of the instant invention broadly comprise (A) the reaction product of (1) of polyurethane polyol, having a hydroxyl value between about 10 and about 200, and (2) a polycarboxylic acid or acid anhydride, and (B) an aminoplast resin. The compositions are useful as sealing-primers on a wide variety of substrates, including EPDM rubber, foam rubber, polyurethane foam and vinyl foam.

DETAILED DESCRIPTION OF THE INVENTION

The compositions of the instant invention contain as one component a polyurethane polyol having a hydroxyl value between about 10 and about 200. This polyurethane polyol is reacted with a polycarboxylic acid or acid anhydride to produce a urethane reaction product which contains both hydroxyl and carboxyl groups, which is then combined with an aminoplast resin. The so-treated urethane can then be applied to a wide variety of different substrates for use as a primer for elastomeric coatings.

The polyurethane polyols are generally produced by reacting a polyhydric material, the major portion of which is selected from the group consisting of polyether polyols, polyester polyols and mixtures thereof, with an organic polyisocyanate. The polyhydric material preferably contains (or is formed from) between about 0.01 and about one gram-mole, and most preferably between about 0.05 and 0.90 gram-mole of compounds having a functionality of 3 or more per 500 grams of a polyhydric material, although acceptable results for some purposes are obtained using no higher functional materials. The conditions of the reaction between the polyhydric material and the polyisocyanate are selected so as to produce an hydroxyl-containing urethane reaction product, i.e., a polyurethane polyol. This can be accomplished by utilizing an equivalent ratio of isocyanate groups in the polyisocyanate to hydroxyl groups in the polyhydric material of less than 1.0, and preferably 0.95 or less, and allowing substantially all the isocyanate groups present to react. When using ratios of 1.0 or less, care must be taken to avoid gelation and for this reason, some monofunctional alcohol may be required. In general, both the polyol content (i.e., materials having a functionality of 3 or more) and the monoalcohol content must be carefully controlled. One way to ascertain in any given case the relative amounts of polyol and mono-alcohol which should be used to avoid gelation is by carrying out successive tests on a small scale with varying proportions of components. It is, in most cases, more convenient to terminate the reaction at the desired stage (determined by viscosity), by the addition of a compound which reacts with the residual isocyanate groups present; this has the additional advantage that higher ratios of isocyanate to hydroxyl can be utilized. Regardless of the method chosen, the reaction between the polyhydric material and the polyisocyanate should generally be terminated when the reaction product has an intrinsic viscosity of 1.0 deciliters per gram or less and preferably 0.80 deciliter per gram or less, since it has been found that resins with high viscosities exhibit poor sprayability. It should be noted that useful products are provided once the reaction between the polyhydric material and the polyisocyanate begins, although preferred products begin to be obtained when the intrinsic viscosity reaches about 0.05. Generally, to start the reaction, heat (e.g., 125°F.) and catalyst (e.g., dibutyltin dilaurate) may be used. The use of heat and catalyst is of course dependent upon the overall composition and the rate of reaction desired.

In producing the desired polyurethane polyol, it is necessary that the polyhydric material employed possess certain properties in order to obtain coatings of the desired characteristics. When using a polyether polyol, these properties are obtained by selecting a polyether polyol, or a mixture of polyether polyols, having relatively long chains per hydroxyl group, and which thus has a hydroxyl equivalent of at least about 100 and preferably at least about 300. The polyether polyol component in most cases consists essentially of one or more diols. Triols or higher polyols can also be used provided the total amount of compounds in the polyhydric component having a functionality of 3 or more is no more than about one gram-mole per 500 grams of the polyhydric material. While it is not always necessary to have a triol or higher polyol present, some branching is desirable, although the polyether should not be highly branched. There may also be present a small amount of monoalcohol, particularly if larger proportions of polyols of higher functionality are used. In certain instances, such as where very high molecular weight polyether polyols are used, the polyols can be largely or even entirely made of compounds of functionality higher than 2.

Among the preferred polyether polyols are the poly(oxyalkylene) glycols. Included are poly(oxytetramethylene) glycols, poly(oxyethylene) glycols, poly(oxytrimethylene)glycols, poly(oxypentamethylene)glycols, poly(oxypropylene)glycols, etc. The preferred polyether polyols of this class are poly(oxytetramethylene)glycols of molecular weight between about 400 and about 10,000.

Also useful are polyether polyols formed from the oxyalkylation of various polyols, for example glycols such as phenylene glycol, 1,6-hexanediol, and the like; or higher polyols, such as trimethylolpropane, trimethylolethane, pentaerythritol, and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, e.g., ethylene or propylene oxide, in the presence of an acidic or basic catalyst.

In addition to the methods indicated, the polyether polyol can be produced by any of the several known techniques, with the reaction conditions and the ratio of reactants chosen so as to provide a product having residual hydroxyl groups, i.e., a polyether polyol, having a hydroxyl equivalent of at least about 100 and preferably not above about 10,000.

Where polyester polyols are employed, the requisite properties are attained by selecting a polyester polyol, or a mixture of polyester polyols, which is formed from a polyol component having an average functionality of at least about 1.9 and an acid component having an average functionality of at least about 1.9. The polyol component in most cases consists essentially of one or more hydroxyl groups. When triols or higher polyols are used, care must be taken to insure that the total amount of compounds in the polyhydric component having a functionality of 3 or more is no more than about one gram-mole per 500 grams of polyhydric material. While it is not always necessary to have a triol or higher polyol present, some branching is desirable, although the polyester should not be highly branched. There may also be present a small amount of monoalcohol, particularly if larger proportions of higher polyols are used. In certain instances, such as where very high molecular weight polyols are used, the polyols can be largely or even entirely made up of compounds of functionality higher than two.

The diols which are usually employed in making the polyester include alkylene glycols, such as ethylene glycol, propylene glycol, butylene glycol, hexylene glycol, and neopentyl glycol, and other glycols such as hydrogenated bisphenol A, cyclohexane dimethanol, caprolactone diol (i.e., the reaction product of caprolactone and diethylene glycol), hydroxyalkylated bisphenols, polyether glycols, e.g., poly(oxytetramethylene) glycol, and the like. However, other diols of various types and, as indicated, polyols of higher functionality can also be utilized. Such higher polyols can include, for example, trimethylolpropane, trimethylolethane, pentaerythritol, and the like, as well as higher molecular weight polyols such as those produced by oxyalkylating low molecular weight polyols. An example of such a higher molecular weight polyol is the reaction product of 20 mols of ethylene oxide per mole of trimethylolpropane.

The acid component of the polyester consists essentially of monomeric carboxylic acids or anhydrides having 2 to 14 carbon atoms per molecule. The acids should have an average functionality of at least about 1.9; the acid component in most instances contains at least about 75 mole percent of dicarboxylic acids or anhydrides. The functionality of the acid component is based upon considerations similar to those discussed above in connection with the alcohol component, the total functionality of the system being kept in mind.

Among the acids which are useful are aromatic and saturated polycarboxylic acids such as phthalic acid, isophthalic acid, terephthalic acid, tetrahydrophthalic acid, hexahydrophthalic acid, adipic acid, azelaic acid, sebacic acid, malic acid, glutaric acid, chlorendic acid, tetrachlorophthalic acid, and other acids of varying types, including 6-hydroxy-octanoic acid, lactones, tartaric acid and the like. The polyester may include minor amounts of monobasic acid, such as benzoic acid, and also there can be employed higher polycarboxylic acids, such as trimellitic acid and tricarballylic acid. Where acids are referred to above, it is understood that the anhydrides of those acids which form anhydrides can be used in place of the acid. It is preferred that the polyester include an aliphatic dicarboxylic acid as at least part of the acid component.

While polyester polyols have been specifically disclosed, it is to be understood that useful products are attainable by substituting a polyesteramide polyol, or a mixture of polyesteramide polyols, for a part of, or all of, the polyester polyol. The polyesteramide polyols are produced by conventional techniques from the above-described acids and diols, and minor proportions of diamines or aminoalcohols. Suitable diamines and aminoalcohols include hexamethylene diamine, monoethanolamine, diethanolamine, phenylenediamines, toluene diamines, and the like. It is thus intended that the polyester polyols usable in the instant invention include such polyesteramide polyols.

The polyester is produced using conventional techniques, with the reaction conditions and the ratio of reactants chosen so as to provide a product having residual hydroxyl groups, i.e., a polyester polyol. The number of hydroxyls present in the product can be varied, but it is preferred that its hydroxyl value be at least about 30 and preferably more than 50.

The overall functionality per unit weight of the polyhydric material preferably should contain (or be formed from) no more than about one gram-mole of compounds having a functionality of 3 or more per 500 grams of the polyhydric material. By "functionality" is meant the number of reactive hydroxyl and carboxyl groups per molecule, with an anhydride group in a molecule being considered as equivalent to two carboxyl groups.

While the polyether polyol or the polyester polyol may constitute the entire polyhydric component, mixtures of polyether polyols and mixtures of polyester polyols, as well as mixtures of polyether and polyester polyols, may be used in widely varied proportions. In addition, other hydroxyl-containing compounds may be added either with the polyhydric material to the polyisocyanate, or to the reaction mixture of the polyhydric material and the polyisocyanate. Such compounds include polyfunctional alcohols, such as 1,4-butanediol, aminoalcohols, neopentyl glycol, trimethylolpropane, tris(hydroxyethyl)isocyanurate, N,N'-bis(hydroxyethyl)dimethyl hydantoin, and Ester Diol 204 (2,2-dimethyl-3-hydroxypropyl-2,2-dimethyl-3-hydroxy-propionate); carbamates of polyols, such as O-hydroxyethyl carbamate and O,N-bis(hydroxyethyl)carbamate; and monohydric alcohols. Other active hydrogen-containing compounds may be added to the reaction mixture, including water; polyamines such as isophorone diamine, p-methane diamine, propylene diamine, hexamethylene diamine and diethylene triamine; and mixtures of the above-mentioned polyamines with ketones, such as cyclohexanone, butanone, and acetone. When using polyamines and ketones, it is preferable to partially react the two, as by holding at room temperature for about one hour, before adding to the urethane reaction mixture, although acceptable results for some purposes are obtained by merely adding the amine and ketone to the reaction mixture.

The polyisocyanate which is reacted with the polyhydric material can be essentially any organic polyisocyanates, e.g., hydrocarbon polyisocyanates or substituted hydrocarbon diisocyanates. Many such organic polyisocyanates are known in the art, including p-phenylene diisocyanate, biphenyl diisocyanate, toluene diisocyanate, 3,3'-dimethyl-4,4'-biphenylene diisocyanate, 1,4-tetramethylene diisocyanate, hexamethylene diisocyanate, 2,4-trimethylhexane-1,6-diisocyanate, methylene bis(phenyl isocyanate), lysine methyl ester diisocyanate, bis(isocyanatoethyl)fumarate, isophorone diisocyanate and methyl cyclohexyl diisocyanate. There can also be employed isocyanate-terminated adducts of diols, such as ethylene glycol, 1,4-butylene glycol, polyalkylene glycols, etc. These are formed by reacting more than one mole of a diisocyanate, such as those mentioned, with one mole of a diol to form a longer chain diisocyanate, alternatively, the diol can be added along with the diisocyanate.

While diisocyanates are preferred, higher polyisocyanates can be utilized as part of the organic polyisocyanate. Examples are 1,2,4-benzene triisocyanate and polymethylene polyphenyl isocyanate.

It is preferred to employ an aliphatic diisocyanate, since it has been found that these provide better color stability when thin finishing coatings (i.e., topcoats) are used, or when the compositions themselves are used as finished coatings. Examples include bis(isocyanatocyclohexyl)methane; 1,4-butylene diisocyanate; methylcyclohexyl diisocyanate, and isophorone diisocyanate.

The conditions of the reaction between the polyhydric material and the polyisocyanate are chosen so as to produce an ungelled hydroxyl-containing urethane reaction product, i.e., a polyurethane polyol. This can be accomplished by utilizing an equivalent ratio of isocyanate groups to hydroxyl groups of less than 1.0, controlling both the polyol and monoalcohol content, and allowing substantially all the isocyanate groups present to react. Alternatively, regardless of the equivalent ratio selected, a compound, or compounds, may be added to the reaction mixture, which will react with residual isocyanate groups and which will effectively terminate the reaction. Suitable compounds include water; ammonia; monofunctional alcohols, such as n-butanol; polyfunctional alcohols, such as monoethanolamine, ethylene glycol, tris(hydroxyethyl)isocyanurate, N,N'-bis(hydroxyethyl)dimethyl hydantoin, trimethylol propane and diethanolamine; carbamates of polyols, primary and secondary amines, such as butylamine, morpholine, allylamine and diethylamine; and, the hereinabove-described polyester polyols. Generally the amount of terminating agent added is such that the equivalent ratio of residual isocyanate groups to isocyanate-reactive groups is less than about one.

In one preferred embodiment of the invention, a polyfunctional alcohol is used to terminate the reaction at the desired stage (determined by the viscosity), thereby also contributing residual hydroxyl groups. Particularly desirable for such purposes are aminoalcohols, since the amino groups preferentially react with the isocyanate present. It should again be noted that regardless of the equivalent ratio chosen, the reaction should generally be terminated when the intrinsic viscosity is 1.0 or less, since resins having high intrinsic viscosities tend to exhibit poor sprayability, and are difficult to handle.

While the ratios of the components of the polyhydric material, the polyisocyanate and any terminating agent may be varied, the amounts of the components should be chosen so as to avoid gelation and so as to produce an ungelled, urethane reaction product which contains hydroxyl groups. The hydroxyl value (as determined by ASTM Designation E222-67, Method B) of the urethane reaction product preferably should be at least about 10 and in most cases is between about 20 and about 200.

As noted earlier, the polyurethane polyols of this invention are reacted with dicarboxylic acids or acid anhydrides to produce the unique sealing primer composition. The reaction quite obviously is an esterification reaction with the acid and acid anhydride groups reacting with the hydroxyl groups of the urethane reaction product. The extent and type of reaction can be determined by infrared spectral analysis by measuring the disappearance of the absorption band due to anhydride and the appearance of an absorption band due to ester linkages. See Example III infra. Suitable anhydrides include phthalic anhydride, maleic anhydride, trimellitic anhydride, succinic anhydride, glutaric anhydride, hexahydrophthalic anhydride, dodecenyl succinic anhydride, bicyclo[2.2.1]hept-2-ene-5,6-dicarboxylic anhydride, chlorendic anhydride, and the like. The preferred anhydrides are phthalic anhydride and maleic anhydride. While anhydrides have been specifically described, it is to be recognized that useful products are attainable utilizing the corresponding acid. However, where polycarboxylic acids are used, it is generally necessary to utilize higher reaction temperatures and strong acid catalysts (e.g., p-toluene sulfonic acid and the like). The amount of acid or acid anhydride added to the polyurethane reaction mixture should generally be between about 0.1 and about 10 percent by weight of the total mixture, and preferably will be between about 0.5 and about 7 percent by weight. The product formed by reacting the anhydride and the polyurethane polyol should be anhydride free, as determined by infrared techniques. Generally, the reaction mixture should be heated to from about 75°C. to about 130°C., and catalyst (e.g., tertiary amines) may be added, although suitable temperatures and the use of catalyst are generally dependent upon the overall composition and the rate of reaction desired.

The product formed will generally contain both carboxyl and hydroxyl groups, and will generally have an acid value of between about one and about 50, and a hydroxyl value between about 10 and about 200. Preferably, the acid value will be between 2 and about 20, and the hydroxyl value will be between about 20 and about 100.

The anhydride treated urethane is then combined with an aminoplast resin to form the unique compositions of this invention.

Aminoplast resins are amine-aldehyde condensation products of melamine, urea, and similar compounds; products obtained from the reaction of formaldehyde with melamine, urea or benzoguanamine are most common and are preferred herein. However, condensation products of other amines and amides can be employed also, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethylurea, benzourea, dicyandimide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrmidine, 2,4,6-triethyltriamino-1,3,5-triazine, and the like.

While the aldehyde employed is most often formaldehyde, other similar condensation products can be made from other aldehydes, such as acetaldehyde, crotonaldehyde, acrolein, benzaldehyde, furfural, and others. The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen-substituted or other substituted alcohols, such as 3-chloropropanol. The preferred aminoplast resins are substantially etherified with methanol or butanol.

In most cases, the priming compositions of the instant invention contain from about 50 to about 95 percent by weight of acid or anhydride-modified polyurethane polyol, and from about 5 to about 50 percent by weight of aminoplast resin. Preferably, the compositions comprise from about 60 to about 90 percent by weight of the acid or anhydride-modified polyurethane polyol, and from about 10 to about 40 percent by weight of aminoplast resin.

For optimum properties, it is preferred to include in the composition a polymeric polyol having a low glass transition temperature, i.e., having a glass transition temperature below about 25°C. The inclusion of such a polymeric polyol gives a balance of flexibility and hardness. Among the preferred polymeric polyols are polyether polyols; especially preferred are poly(oxyalkylene) glycols such as polyethylene glycol, polypropylene glycol, and other such glycols having up to about 6 carbon atoms separating each pair of oxygen atoms. A specific preferred polyol is poly(oxytetramethylene) glycol. Other highly desirable polymeric polyols are polyester polyols having the desired glass transition temperature, expecially those produced from acyclic reactants such as adipic acid and azelaic acid and alkylene glycols; poly(neopentyl adipate) is a useful example. Still other polymeric polyols of suitable properties include condensates of lactones with polyols, such as the product from caprolactone and ethylene glycol, diethylene glycol, propylene glycol, trimethylolpropane, etc.

The polymeric polyol can be incorporated into the composition in various ways. In some instances the polyester polyol employed can serve as the polymeric polyol, but this does not usually provide a coating of suitable hardness. More usually, the "soft" polymeric polyol is used in conjunction with a polyester polyol (or constituent thereof) having a higher glass transition temperature. One method is to include the polymeric polyol in the polyester as part of the polyol component; another way is to produce an isocyanatoterminated adduct or prepolymer from the polymeric polyol and the polyisocyanate; a third method is to blend the polymeric polyol as such with the polyester before or after the polyester is reacted with the polyisocyanate; a fourth method is to blend the aminoplast resin with the polymeric polyol before addition to the reaction product. The choice of method depends upon the particular components used and the properties desired, but in each instance the product contains both "hard" and "soft" segments in a type of block copolymer in the cured coating.

The composition in which the polymeric polyol is included generally contains from about 25 to about 90 percent by weight and preferably from about 45 to about 90 precent by weight of modified polyurethane, from about 5 to about 50 and preferably from about 10 to about 40 percent by weight of aminoplast, and up to about 45 percent by weight and preferably from about 2 to about 30 percent by weight of polymeric polyol.

In addition to the components above, the compositions can contain any of the various additives ordinarily utilized in coatings of this general class. Such additives can include, for example, pigments, fillers, plasticizers, anti-oxidants, flow control agents, surfactants and the like. The composition is ordinarily contained in a solvent, which can be any solvent or solvent mixture in which the materials employed are compatible and soluble to the desired extent.

The compositions herein can be applied by any convenient method, including brushing, dipping, flow coating, and the like, but they are most often applied by apraying. Usual spray techniques and equipment are utilized. The compositions can be applied to virtually any substrate, including wood, metals, glass, cloth, plastics, foams, and the like. While the use of the sealing-primer compositions of the instant invention enhance the properties of topcoats over a variety of different substrates, it has been found that the most significant improvements occur when applying the compositions to an EPDM rubber (i.e., ethylene-propylene-diene monomers) substrate. It has also been found that the compositions of this invention form unique chip-resistant coatings over metal substrates.

Similarly, the compositions of the instant invention are effective primers for a wide variety of coating materials. In general, however, it is preferred to use the instant compositions in conjunction with extensible or elastomeric coating compositions.

The priming compositions containing the aminoplast resins are generally cured at elevated temperatures. In most cases, the cure schedule is from about 20 to about 40 minutes at 140°F. to 260°F. Higher or lower temperatures with correspondingly shorter and longer times can be utilized, although the exact cure schedule best employed depends in part upon the nature of the substrate, as well as the particular components of the composition. Acid catalysts and other curing catalysts may be added, permitting the use of lower temperatures and/or shorter times.

The invention will be further described in connection with several examples which follow. These examples are given as illustrative of the and are not to be construed as limiting it to their details. All parts and percentages in the examples and throughout the specification are by weight unless otherwise indicated.

EXAMPLE I

The following were charged to a reactor:

| | Parts by Weight |
|---|---|
| Poly(1,6-hexendiol adipate) — molecular weight~ 1000 | 4680 |
| Bis(isocyanatocyclohexyl)methane | 2326 |
| Esterdiol 204 | 408 |
| Trimethylolpropane | 360 |
| Methyl n-butyl ketone | 6800 |
| Dibutyltin dilaurate | 0.08 |
| Triethylenediamine | 38 |

This mixture was held at 95°C. for 7 hours. The reaction was then terminated by the addition of 60 parts of monoethanolamine, 264 parts of polycaprolactone triol (reaction product of caprolactone and trimethylolpropane; molecular weight $\mu$300), and 80 parts of methyl n-butyl ketone, followed by heating at 95°C. for 45 minutes. Maleic anhydride (120 parts) was then added to the mixture. The mixture was held at 95°C for 30 minutes, followed by the addition of 2800 parts of an alcohol blend (isopropanol/butanol of 3/1) to reduce the resin viscosity. The resultant product had an acid value of 4.5 at 44.7 percent solids, a Gardner-Holdt viscosity of X-Y, and a hydroxyl value of 45.8 at 100 percent solids.

Using the product above, a primer coating was formulated as follows:

| | Parts by Weight |
|---|---|
| Polyurethane polyol | 74.5 |
| Butylated melamine formaldehyde resin | 25.0 |
| Phenylacid phosphate | 0.5 |

Various pigments were dispersed in the resin to give a pigment-to-binder ratio of 0.22. The composition was then spray applied to a UV-benzophenone treated Nordel substrate (an EPDM rubber substrate available from DuPont) and cured to give an adherent, highly flexible, non-spewing primer.

EXAMPLE II

The anhydride-modified polyurethane polyol of Example I was spray applied onto an EPDM substrate, and was baked for 20 minutes at 280°F. An elastomeric coating composition of the type formed in Example I of Application Ser. No. 347,022, filed Apr. 2, 1973, was then coated over the primer and was cured. The same elastomeric coating composition was applied to an EPDM substrate without the primer of the instant invention.

The umprimed EPDM overcoat developed a hazy film after a few days (the film is thought to be an extending or plasticizing oil migrating to the surface.) The unprimed overcoat rapidly lost gloss and yellowed severely under accelerated weathering conditions (Atlas Weatherometer). The primed EPDM, on the other hand, did not form a hazy film, showed excellent gloss retention, and did not yellow.

EXAMPLE III

The following were charged to a reactor:

| | Parts by Weight |
|---|---|
| Polycaprolactone diol (reaction product of caprolactone and diethylene glycol, molecular weight~1250) | 1170 |
| Methylisobutyl ketone | 500 |
| Bis(isocyanatocyclohexyl)methane | 580 |
| Dibutyltin dilaurate | 0.02 |

The mixture as held at 105°C. for one hour. There were then added 107 parts of trimethylolpropane, a blend of 88 parts of isophrone diamine and 176 parts of cyclohexanone, and 1480 parts of methyl n-butyl ketone. The temperature was held at 105°C. for 7 hours. The reaction was then terminated by adding 14 parts of monoethanolamine and 69 parts of a polycaprolactone triol (reaction product of caprolactone and trimethylolpropane, molecular weight $\mu$300).

The polyurethane polyol thus produced was then reacted with various acid anhydrides. In each case, 50 parts of polyurethane polyol were used, and the reaction was essentially complete (i.e., no infrared band for anhydride) after about 2½ hours at 105°C.

| Anhydride | Parts by Weight |
|---|---|
| Phthalic | 0.22 |
| Phthalic | 0.44 |
| Trimellitic | 0.22 |
| Trimellitic | 0.44 |
| Succinic | 0.22 |
| Succinic | 0.44 |
| Dodecylsuccinic | 0.22 |
| Dodecylsuccinic | 0.44 |
| Bicyclo[2.2.1]hept-2-ene-5,6-dicarboxylic | 0.22 |
| Bicyclo[2.2.1]hept-2-ene-5,6-dicarboxylic | 0.44 |
| Hexahydrophthalic | 0.22 |
| Hexahydrophthalic | 0.44 |
| Maleic | 0.22 |

-continued

| Anhydride | Parts by Weight |
|---|---|
| Maleic | 0.44 |
| Chlorendic | 0.22 |
| Chlorendic | 0.44 |

The compositions thus produced could then be formulated with an aminoplast resin to provide a sealing-primer composition possessing the desirable properties described herein.

In a similar manner, priming compositions of desirable properties are produced using other polyurethanes as well as polycarboxylic acids and other anhydrides in place of the materials specifically shown in the examples.

According to the provisions of the Patent Statutes, there are described above the invention and what are now considered to be its best embodiments. However, within the scope of the appended claims, it is to be understood that the invention can be practiced otherwise than as specifically described.

We claim:
1. A sealing-primer composition comprising:
   A. a hydroxyl-containing, carboxyl-containing reaction product of:
      1. an ungelled, hydroxy-containing urethane reaction product of an organic polyisocyanate and a polyhydric material, said reaction being terminated when the intrinsic viscosity of the reaction product is 1.0 deciliter per gram or less and the NCO/OH equivalent ratio being less than 1, with the major portion of said polyhydric material being selected from the group consisting of polyether polyols, saturated polyester polyols and mixtures thereof, wherein said polyhydric material contains no more than about 1 gram-mole of compounds having a functionality of 3 or more per 500 grams of polyhydric material, said urethane reaction product having a hydroxyl value of between about 10 and about 200; and
      2. 0.1 to about 10 percent by weight based on total weight of the reaction mixture of a compound selected from the group consisting of polycarboxylic acids and polycarboxylic acid anhydrides; the acid and anhydride groups reacting with the hydroxyl groups of the urethane product to form a hydroxyl-containing, carboxyl-containing reaction product, and
   B. an amine-aldehyde condensation product.
2. A composition according to claim 1, wherein said compound is a polycarboxylic acid anhydride.

3. A composition according to claim 1, wherein the major portion of said polyhydric material is a saturated or an aromatic polyester polyol formed from an alcohol component having an average functionality of at least 1.9, and an acid component consisting essentially of one or more monomeric carboxylic acids or anhydrides having 2 to 14 carbon atoms per molecule, said acid component having an average functionality of at least about 1.9.

4. A composition according to claim 1, wherein said polycarboxylic acid anhydride is maleic anhydride.

5. A composition according to claim 1, wherein said polycarboxylic acid anhydride is phthalic anhydride.

6. A composition according to claim 1, wherein component (A) has a hydroxyl value between about 10 to about 200, and an acid value between about one and about 50.

7. A composition according to claim 1, further including a polymeric polyol having a glass transition temperature of below about 25°C.

8. A composition according to claim 2, wherein said polycarboxylic acid anhydride comprises from about 0.1 to about 10 percent by weight of component (A).

9. A method of producing a sealing-primer composition comprising:
   A. reacting an organic polyisocyanate with a polyhydric material, said reaction being terminated when the intrinsic viscosity of the reaction product is 1.0 deciliter per gram or less, the NCO/OH equivalent ratio being less than 1, the major portion of said polyhydric material being selected from the group consisting of polyether polyols, saturated polyester polyols, and mixtures thereof, wherein said polyhydric material contains no more than about 1 gram-mole of compounds having a functionality of 3 or more per 500 grams of polyhydric material, the reaction product thereof being an ungelled, hydroxyl-containing urethane reaction product having a hydroxyl value between about 10 and about 200;
   B. reacting said ungelled, hydroxyl-containing urethane reaction product with 0.1 to about 10 percent by weight based on total weight of the reaction mixture of a compound selected from the group consisting of polycarboxylic acids and polycarboxylic acid anhydrides, the acid and the anhydride groups reacting with the hydroxyl groups of the urethane reaction product, thereby producing a modified urethane reaction product containing hydroxyl groups and carboxyl groups; and
   C. adding an amine-aldehyde condensation product to said modified urethane reaction product.

10. A method according to claim 9, wherein said compound is a polycarboxylic acid anhydride.

* * * * *

UNITED STATES PATENT OFFICE
CERTIFICATE OF CORRECTION

PATENT NO. : 3,962,369
DATED : June 8, 1976
INVENTOR(S) : Wen-Hsuan Chang, Roger L. Scriven and Paul J. Prucnal It is certified that error appears in the above-identified patent and that said Letters Patent are hereby corrected as shown below:

Column 3, line 66, after "more" insert ---diols with up to about 25 mole percent of polyols present having 3 or more---.

Column 4, line 44, "sebacid" should be ---sebacic---.

Column 7, line 28, after "between" insert---about---.

Column 10, line 24, "umprimed" should be ---unprimed---.

Column 10, line 43, "as" should be ---was---.

Column 10, line 45, "isophrone" should be ---isophorone---.

Column 11, line 28, "hydroxy" should be ---hydroxyl---.

Column 11, line 49, after "urethane" insert ---reaction---.

Column 12, line 15, "to" should be ---and---.

Signed and Sealed this

Thirty-first Day of August 1976

Attest:

RUTH C. MASON
*Attesting Officer*

C. MARSHALL DANN
*Commissioner of Patents and Trademarks*